United States Patent
Yang et al.

(10) Patent No.: US 7,031,388 B2
(45) Date of Patent: Apr. 18, 2006

(54) SYSTEM FOR AND METHOD OF SHARPNESS ENHANCEMENT FOR CODED DIGITAL VIDEO

(75) Inventors: Yibin Yang, Pine Brook, NJ (US); Lilla Boroczky, Mount Kisco, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 472 days.

(21) Appl. No.: 10/139,175

(22) Filed: May 6, 2002

(65) Prior Publication Data

US 2003/0206591 A1 Nov. 6, 2003

(51) Int. Cl.
*H04N 1/66* (2006.01)
(52) U.S. Cl. .................................. 375/240.16
(58) Field of Classification Search ........... 375/240.01–240.29; H04N 7/12; H04B 1/66
See application file for complete search history.

(56) References Cited

U.S. PATENT DOCUMENTS

| | | | | |
|---|---|---|---|---|
| 5,844,614 A * | 12/1998 | Chong et al. | ........... | 375/240.24 |
| 6,466,624 B1 * | 10/2002 | Fogg | ................ | 375/240.27 |
| 6,674,799 B1 * | 1/2004 | Rhee | ................ | 375/240.21 |
| 6,862,372 B1 * | 3/2005 | Yang et al. | ............. | 382/254 |
| 6,873,657 B1 * | 3/2005 | Yang et al. | ............. | 375/240.16 |
| 6,950,561 B1 * | 9/2005 | Boroczky et al. | ....... | 382/263 |

* cited by examiner

*Primary Examiner*—Tung Vo
(74) *Attorney, Agent, or Firm*—Edward W. Goodman

(57) ABSTRACT

A method and system for calculating a UME for each pixel in a frame of video data. A system for enhancing sharpness of a coded digital video signal representative a frame of block-based data is provided, comprising: a system for calculating a UME of each pixel in the frame in accordance with a frame type, wherein the calculating system includes: a mechanism that defines local spatial features in the frame; a mechanism that analyzes block-based motion estimation for the frame; a mechanism that detects a scene change in the frame; and a sharpness enhancer that improves sharpness to a decoded version of the digital video signal based on said UME.

29 Claims, 7 Drawing Sheets

SYSTEM FOR AND METHOD OF SHARPNESS ENHANCEMENT FOR CODED DIGITAL VIDEO

BACKGROUND OF THE INVENTION

1. Field of the Invention

The present invention is directed to a system and method for enhancing the quality of a digital video signal using coding information, local spatial features, and motion information. The system and method of the invention enhances the sharpness of encoded or transcoded digital video without enhancing encoding artifacts.

2. Description of the Related Art

The development of high-quality multi-media devices, such as set-top boxes, high-end TV's, Digital TV's, Personal TV's, storage products, PDA's, wireless internet devices, etc., is leading to a variety of architectures and to more openness towards new features for these devices. Moreover, the development of these new products and their ability to display video data in any format has resulted in new requirements and opportunities with respect to video processing and video enhancement algorithms.

MPEG (Moving Picture Expert Group) video compression is used in many current and emerging products. MPEG is at the heart of digital television set-top boxes, DSS, HDTV decoders, DVD players, video conferencing, Internet video, and other applications. These applications benefit from video compression by requiring less storage space for archived video information, less bandwidth for the transmission of the video information from one point to another, or a combination of both. Most of these devices receive and/or store video in the MPEG-2 format. In the future, they may receive and/or store video in the MPEG-4 format. The picture quality of these MPEG sources can vary greatly.

Research into human visual system has shown that the eye is more sensitive to changes in luminance, and less sensitive to variations in chrominance. MPEG operates on a color space that effectively takes advantage of the eye's different sensitivity to luminance and chrominance information. Thus, MPEG uses a YCbCr color space to represent the data values instead of RGB; where Y is the luminance component, experimentally determined to be $Y=0.299R+0.587G+0.114B$, Cb is the blue color difference component, where $Cb=B-Y$, and Cr is the red color difference component, where $Cr=R-Y$.

MPEG video is arranged into a hierarchy of layers to help with error handling, random search and editing, and synchronization, for example with an audio bit-stream. The first layer, or top layer, is known as the video sequence layer, and is any self-contained bitstream, for example a coded movie, advertisement or a cartoon.

The second layer, below the first layer, is the group of pictures (GOP), which is composed of one or more groups of intra (I) frames and/or non-intra (P or B) pictures. I frames are strictly intra compressed, providing random access points to the video. P frames are motion-compensated forward-predictive-coded frames, which are inter-frame compressed, and typically provide more compression than I frames. B frames are motion-compensated bi-directionally-predictive-coded frames, which are inter-frame compressed, and typically provide the most compression.

The third layer, below the second layer, is the picture layer itself. The fourth layer beneath the third layer is called the slice layer. Each slice is a contiguous sequence of raster ordered macroblocks, most often on a row basis in typical video applications. The slice structure is intended to allow decoding in the presence of errors. Each slice consists of macroblocks, which are 16×16 arrays of luminance pixels, or picture data elements, with two or more 8×8 arrays (depending on format) of associated chrominance pixels. The macroblocks can be further divided into distinct 8×8 blocks, for further processing such as transform coding. A macroblock can be represented in several different manners when referring to the YCbCr color space. The three formats commonly used are known as 4:4:4, 4:2:2 and 4:2:0 video. 4:2:2 contains half as much chrominance information as 4:4:4, which is a full bandwidth YCbCr video, and 4:2:0 contains one quarter of the chrominance information. Because of the efficient manner of luminance and chrominance representation, the 4:2:0 representation allows immediate data reduction from 12 blocks/macroblock to 6 blocks/macroblock.

I frames provide only moderate compression as compared to the P and B frames, where MPEG derives its maximum compression efficiency. The efficiency is achieved through a technique called motion compensation based prediction, which exploits temporal redundancy. Since frames are closely related, it is assumed that a current picture can be modeled as a translation of the picture at the previous time. It is possible then to accurately predict the data of one frame based on the data of a previous frame. In P frames, each 16×16 sized macroblock is predicted from the macroblocks of previously encoded I or P picture. Since frames are snapshots in time of a moving object, the macroblocks in the two frames may not correspond to the same spatial location. The encoder would search the previous frame (for P-frames, or the frames before and after for B-frames) in half pixel increments for other macroblock locations that are a close match to the information that is contained in the current macroblock. The displacements in the horizontal and vertical directions of the best match macroblocks from a cosited macroblock are called motion vectors. The difference between the current block and the matching block and the motion vector are encoded. The motion vectors can also be used for motion prediction in case of corrupted data, and sophisticated decoder algorithms can use these vectors for error concealment. For B frames, motion compensation based prediction and interpolation is performed using reference frames present on either side of each frame.

Next generation storage devices, such as the blue-laser-based Digital Video Recorder (DVR) will have to some extent HD (High Definition) (ATSC) capability and are an example of the type of device for which a new method of picture enhancement would be advantageous. An HD program is typically broadcast at 20 Mb/s and encoded according to the MPEG-2 video standard. Taking into account the approximately 25 GB storage capacity of the DVR, this represents about a two-hour recording time of HD video per disc. To increase the record time, several long-play modes can be defined, such as Long-Play (LP) and Extended-Long-Play (ELP) modes.

For LP-mode the average storage bitrate is assumed to be approximately 10 Mb/s, which allows double record time for HD. As a consequence, transcoding is an integral part of the video processing chain, which reduces the broadcast bitrate of 20 Mb/s to the storage bitrate of 10 Mb/s. During the MPEG-2 transcoding, the picture quality (e.g., sharpness) of the video is most likely reduced. However, especially for the LP mode, the picture quality should not be compromised too much. Therefore, for the LP mode, post-processing plays an important role in improving the perceived picture quality.

To date, most of the state-of-the-art sharpness enhancement algorithms were developed and optimized for analog video transmission standards like NTSC (National Television System Committee), PAL (Phase Alternation Line) and SECAM (SEquential Couleur A Memoire). Traditionally, image enhancement algorithms either reduce certain unwanted aspects in a picture (e.g., noise reduction) or improve certain desired characteristics of an image (e.g., sharpness enhancement). For these emerging storage devices, the traditional sharpness enhancement algorithms may perform sub-optimally on MPEG encoded or transcoded video due to the different characteristics of these sources. In the closed video processing chain of the storage system, information that allows for determining the quality of the encoded source can be derived from the MPEG stream. This information can potentially be used to increase the performance of video enhancement algorithms.

Because picture quality will remain a distinguishing factor for high-end video products, new approaches for performing video enhancement, specifically adapted for use with these sources, will be beneficial. In C-J Tsai, P. Karunaratne, N. P. Galatsanos and A. K. Katsaggelos, "A Compressed Video Enhancement Algorithm", *Proc. of IEEE, ICIP'99*, Kobe, Japan, Oct. 25–28, 1999, the authors propose an iterative algorithm for enhancing video sequences that are encoded at low bit rates. For MPEG sources, the degradation of the picture quality originates mostly from the quantization function. Thus, the iterative gradient-projection algorithm employed by the authors uses coding information such as quantization step size, macroblock types and forward motion vectors in its cost function. The algorithm shows promising results for low bit rate video, however, the method is marked by high computational complexity.

In B. Martins and S. Forchammer, "Improved Decoding of MPEG-2 Coded Video", *Proc. of IBC'2000*, Amsterdam, The Netherlands, Sep. 7–12, 2000, pp. 109–115, the authors describe a new concept for improving the decoding of MPEG-2 coded video. Specifically, a unified approach for deinterlacing and format conversion, integrated in the decoding process, is proposed. The technique results in considerably higher picture quality than that obtained by ordinary decoding. However, to date, its computational complexity prevents its implementation in consumer applications.

Both papers describe video enhancement algorithms using MPEG coding information and a cost function. However, both of these scenarios, in addition to being impractical, combine the enhancement and the cost function. A cost function determines how much, and at which locations in a picture, enhancement can be applied. The problem resulting from this combination of cost and enhancement functions is that only one algorithm can be used with the cost function.

Moreover, previous attempts to improve the sharpness enhancement algorithms, utilized only the coding information from the MPEG bitstream. The previous sharpness enhancement algorithms did not differentiate between different picture types, such as I, P and B frames. Consequently, the optimal sharpness enhancement result was not achieved, as picture parts with coding artifacts and the artifact-free parts were not differentiated. The result may be a sub-optimal sharpness enhancement.

SUMMARY OF THE INVENTION

The present invention addresses the above-mentioned problems, as well as others, by providing a system and method that calculates a usefulness metric for enhancement (UME) for each pixel in a frame, and enhances sharpness using the UME. In a first aspect, the invention provides a system for enhancing sharpness of a coded digital video signal representative a frame of block-based data, said system comprising: (1) a system for calculating a UME of each pixel in the frame in accordance with a frame type, wherein the calculating system includes: a mechanism that defines local spatial features in the frame; a mechanism that analyzes block-based motion estimation for the frame; and a mechanism that detects a scene change in the frame; and (2) a sharpness enhancer that improves sharpness to a decoded version of the digital video signal based on said UME.

In a second aspect, the invention provides a method for enhancing sharpness of a coded digital video signal representative a frame of block-based data, the method comprising: providing a mechanism that defines local spatial features in the frame; providing a mechanism that analyzes block-based motion estimation for the frame; providing a mechanism that detects a scene change in the frame; calculating a UME of each pixel in the frame based on local spatial features, block-based motion estimation and detected scene changes; and improving sharpness of the frame by applying the UME calculated for each pixel.

In a third aspect, the invention provides a program product stored on a recordable medium for calculating a UME for each pixel in a frame of video data, the program product comprising: means for defining local spatial features in the frame; means for analyzing block-based motion estimation for the frame; and means for detected a scene change in the frame.

DETAILED DESCRIPTION OF THE INVENTION

Reference will now be made in detail to the present preferred embodiments of the invention, an example of which is illustrated in the accompanying drawings. The method and corresponding steps of the invention will be described in conjunction with the detailed description of the system.

I. Overview

FIGS. 1 through 8, discussed below, and the various embodiments herein to describe the principles of the system and method of the present invention, are by way of illustration only and should not be construed in any way to limit the scope of the invention. The system and method of the present invention will be described as a system for and method of enhancing image quality of a coded digital video signal. It is important to realize that the system and method of the present invention is not limited to digital television sets. Those skilled in the art will readily understand that the principles of the present invention may be successfully applied in any type of digital video system, including, without limitation, television receivers, set top boxes, storage devices, computer video display systems, and any type of electronic equipment that utilizes or processes digital video signals. The term "digital video system" is used to refer to these and other similar types of equipment available now or in the future. In an exemplary embodiment that follows, a digital television set is employed as one representative illustration of a digital video system.

The invention can, for example, be applied to high definition (HD) and standard definition (SD) sequences such as would be present in a video storage application having high definition capabilities and allowing long play (LP) mode. The majority of such video sequences are transcoded to a lower storage bitrate from broadcast MPEG-2 bitstreams. For the long play (LP) mode of this application, format change can also take place during transcoding. Standard definition (SD) or high definition (HD) video sequences that are encoded, decoded, and then processed with the sharpness enhancement algorithm, according to the present invention, provide superior video quality for a priori encoded or transcoded video sequences as compared to algorithms that do not use coding information.

Figure 1:
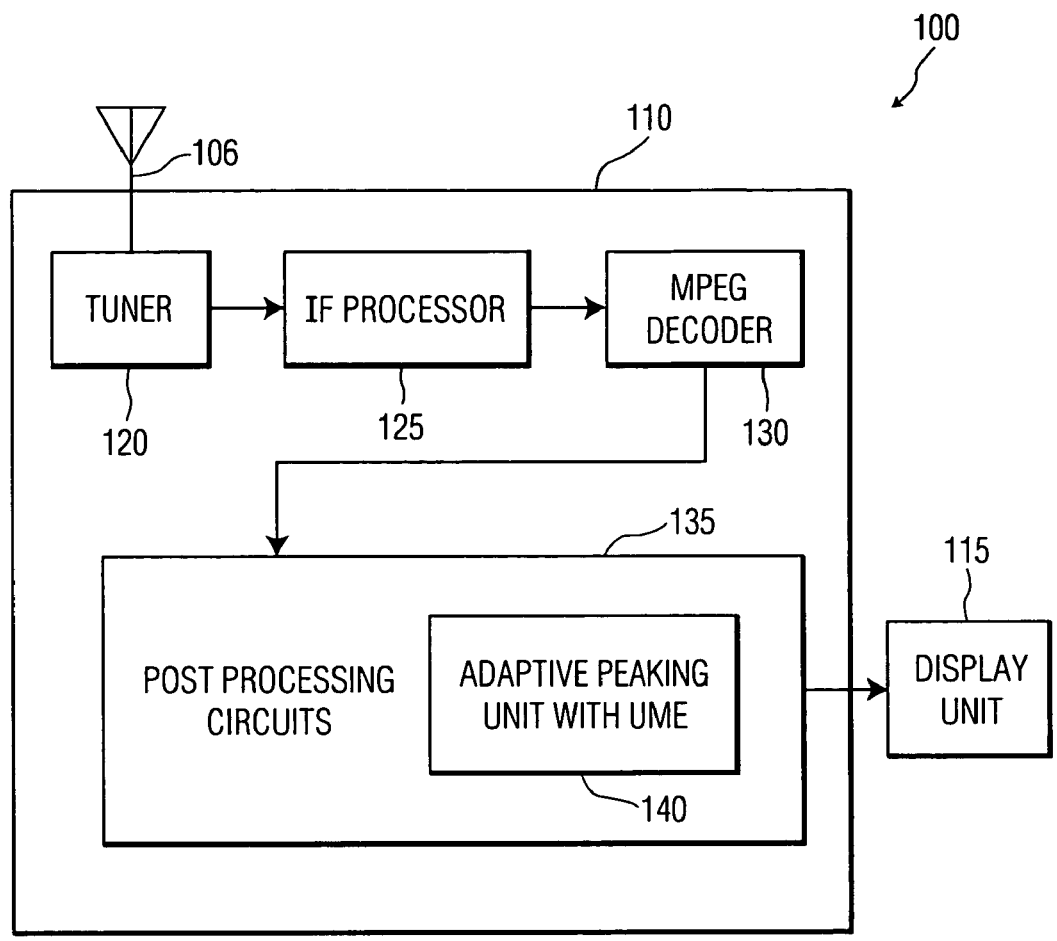
FIG. 1 is a block diagram of an exemplary digital television set comprising the system and method of the present invention.

FIG. 1 is a block diagram of a digital television set 100 that utilizes the apparatus and method of the present invention. Digital television set 100 comprises television receiver 110 and display unit 115. Display unit 115 may be a cathode ray tube or a flat panel display or any type of equipment for displaying video images. Television receiver 110 comprises antenna 105 for receiving television signals. Antenna 105 is coupled to tuner 120. Tuner 120 is coupled to intermediate frequency ("IF") processor 125. IF processor 125 as embodied herein, is coupled to a decoder 130. While the present invention depicts an MPEG decoder, the invention is not limited to MPEG type encoding/decoding applications. According to other embodiments of the present invention, any block based compression schemes, such as, for example, JPEG (still image compression standard), MPEG-1,2,4 (digital video standards), H.261, H. 263 (video conferencing standards) and others can be utilized. In these standards, a two-dimensional (2D) DCT (Discrete Cosine Transform) is applied to 8 by 8 blocks of pixels in the image that is compressed. The 64 (8×8=64) coefficients produced by the DCT are then quantized to provide the actual compression. In typical images, most DCT coefficients from a DCT on an 8 by 8 block of pixels are small and become zero after quantization. This property of the DCT on real world images is important to the compression schemes.

In accordance with the present invention a method and corresponding system are provided for enhancing image quality of a coded digital video signal representative of at least one frame in a digital video system. The method generally includes, as described in detail below, the steps of creating a usefulness metric for enhancement (UME) to be applied to enhance the coded digital video signal. Specifically, the UME comprises a gain value, generally between zero and one, which can be calculated and applied for each pixel in a frame. Calculation of the UME is based on various criteria, including: (1) local spatial features in the frame; (2) block-based motion estimation; (3) scene change detection; (4) coding information; and (5) frame type. Once calculated, the UME is then applied to at least one sharpness enhancement algorithm to generate an enhanced digital video signal.

Figure 2:
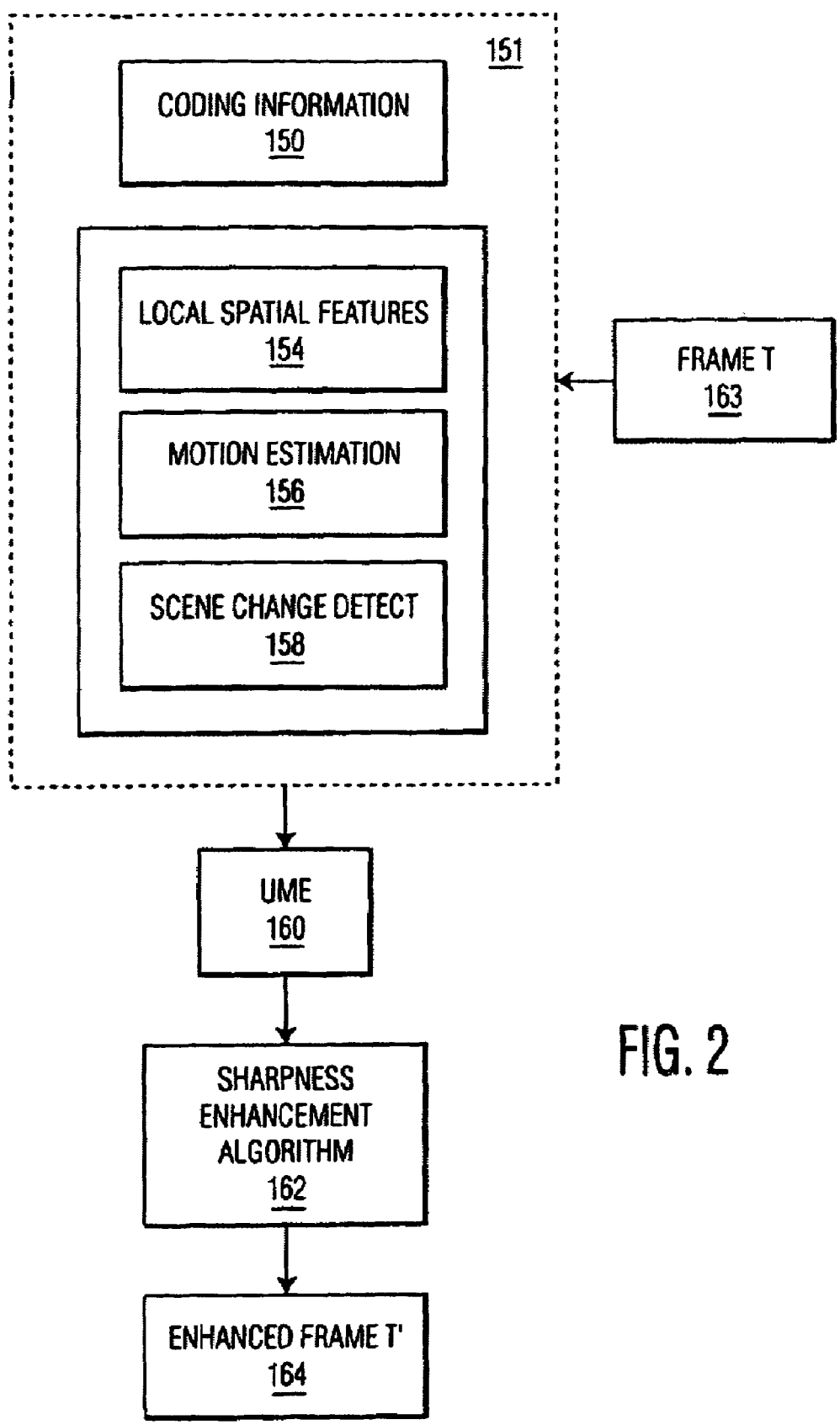
FIG. 2 is a flow diagram illustrating a method of operation of the present invention.

FIG. 2 is a system diagram illustrating an embodiment of the present invention. The implementation of the system embodied in FIG. 2 will be described in greater detail below. A UME generator 151 for processing a frame (frame t) is provided. UME generator 151 utilizes coding information 150, as well as other analysis mechanisms 154, 156 and 158 to calculate a UME 160 for each pixel in each 8×8 block in the frame t. Once calculated, UME 160 can be applied to at least one sharpness enhancement algorithm 162 to generate an enhanced frame t' 164.

Referring again to FIG. 1, the output of MPEG decoder 130 is coupled to post-processing circuits 135 for application of a sharpness enhancement algorithm. For example, and not limitation, post processing circuits 135 may comprise an adaptive peaking unit 140 comprising the UME system of the present invention. Adaptive peaking unit 140 may be located at an appropriate location within the post-processing circuits 135. The output of post-processing circuits 135 is input to display unit 115.

As embodied herein, for purpose of illustration, adaptive peaking unit 140 processes the video signals received from MPEG decoder 130. Adaptive peaking unit 140 uses the UME in this example in the adaptive peaking process. It is understood that the system and method of the present invention are not limited to the process of adaptive peaking. The UME may be used with more than one alternative type of video enhancement algorithm.

Adaptive peaking unit 140 processes the video signals in a manner that takes into account the coding information in the video signal as well other information provided by analysis mechanisms, i.e., local spatial features 154, block-based motion estimation 156 and scene change detection 158 within UME generator 151 (FIG. 2). The output of adaptive peaking unit 140 is an enhanced luminance signal for the video signals that adaptive peaking unit 140 receives from MPEG decoder 130. The luminance signal that is determined by adaptive peaking unit 140 provides a more accurate and visually distinct video image than that provided by prior art adaptive peaking units as will be described further below. Adaptive peaking unit 140 transfers the enhanced luminance signal to other circuits within post processing circuits 135. Post-processing circuits 135 are capable of enhancing the quality of video signals.

Post-processing circuits 135 are capable of carrying out several different types of video signal processing. For example, some of the video signal processing applications include: (a) noise level adaptive noise reduction algorithms, (b) noise level adaptive sharpness enhancement, (c) noise level adaptive luminance-chrominance separation, (d) noise level adaptive motion detection, (e) noise level adaptive motion estimation and compensation, (f) noise level adaptive up-conversion, (g) noise level adaptive feature enhancement, and (h) noise level adaptive object based algorithms.

Figure 3:
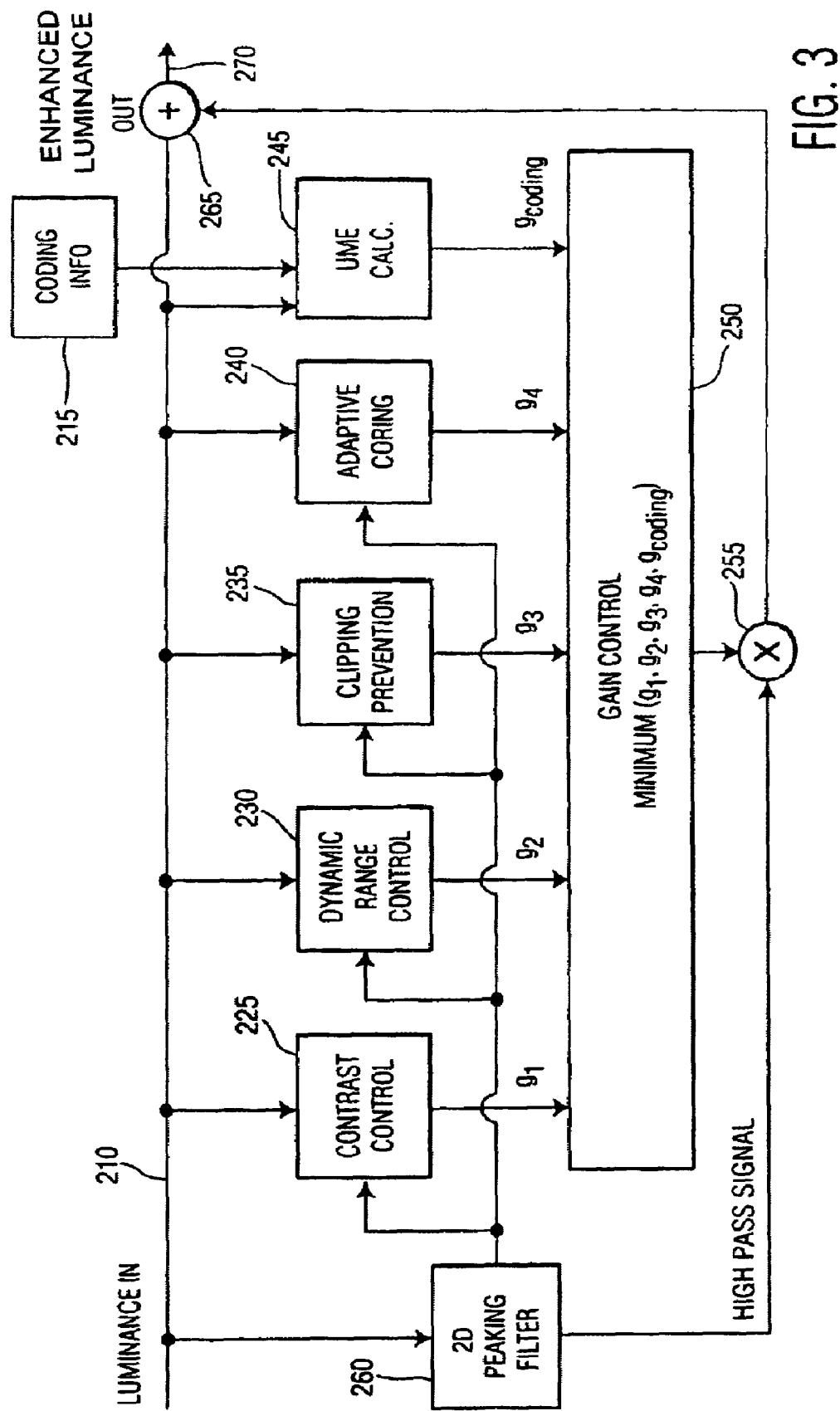
FIG. 3 is a block diagram illustrating an adaptive peaking unit comprising a usefulness metric generator and a UME control block of the present invention.

FIG. 3 is a block diagram illustrating a system and method of adaptive peaking unit 140 according to one exemplary embodiment of the present invention. FIG. 3 illustrates how the UME of the present invention can be applied to an adaptive peaking algorithm for sharpness enhancement. The adaptive peaking algorithm is directed at increasing the amplitude of the transient of an input luminance signal 210. The adaptive peaking algorithm conventionally does not always provide optimal video quality for an "a priori"

encoded/transcoded video source. This is mainly a result of the fact that the characteristics of the MPEG source are not taken into account.

The principles used by adaptive peaking algorithms are well known in the art. One example of an adaptive peaking algorithm utilizes four (4) pixel-based control blocks. As shown in FIG. 3, the four (4) control blocks are contrast control block 225, dynamic range control block 230, clipping prevention block 235, and adaptive coring block 240. Contrast control block 225 generates gain signal "$g_1$". Dynamic range control block 230 generates gain signal "$g_2$". Clipping prevention block 235 generates gain signal "$g_3$". Adaptive coring block 240 generates gain signal "$g_4$". These four (4) pixel based control blocks take into account particular local characteristics of the video signal such as contrast, dynamic range, and noise level. However, these four (4) control blocks do not take into account information concerning coding properties of the video signal, motion estimation, and scene changes.

The system of the present invention provides a UME calculation system 245 that uses, among other things, coding information 215 to determine a preferable amount of peaking, as discussed further below. UME calculation system 245 generates UME information "$g_{coding}$".

Dynamic gain control block 250 selects the minimum of the five (5) gain signals (g1, g2, g3, g4, $g_{coding}$) to generate a final gain signal "g." Multiplier circuit 255 multiplies the final gain signal "g" by the high pass signal that has been filtered by 2D peaking filter 260. Adder 265 adds the product from multiplier circuit 255 to the original luminance value of a pixel represented by luminance input signal 210. In this manner, the enhanced luminance output signal 270 is generated. Each of these functions can be performed by suitable components well known in the art.

Figure 4:
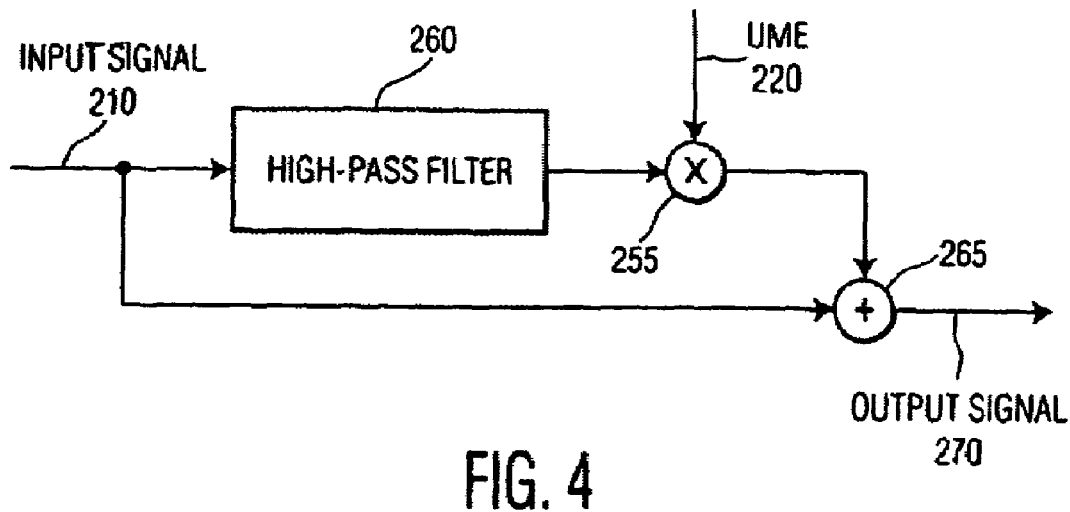
FIG. 4 is a block diagram illustrating an alternate embodiment of a sharpness enhancement algorithm used in accordance with the present invention.

For purposes of example and not limitation, FIG. 4 illustrates a typical system for enhancing sharpness of a coded digital video in accordance with the present invention. The system comprises a high-pass filter 260 for filtering the input video signal 210, a multiplier 255 for multiplying the high pass filtered signal by UME 220 determined through any of the methods of the present invention. The multiplication generates a gain-controlled signal. The system further includes an adder 265 for adding the input video signal 210 with the gain controlled signal and generating the enhanced luminance output signal 270 which has improved picture quality as compared to the input signal 210. In an exemplary embodiment of the present invention, the high-pass filter to be used may be:

$$k * \begin{bmatrix} 0 & -1 & 0 \\ -1 & 4 & -1 \\ 0 & -1 & 0 \end{bmatrix},$$

wherein k is a scaling factor in the range between 0 and 1, i.e. (0,1], thus excluding 0, but including 1. Factor k typically depends on the subjective perception of the user. For sharper images k is increased.

The result of the sharpness enhancement system, as illustrated in FIG. 4 is the following:

out_pixel=input_pixel+*UME*\*convolution_result, wherein output_pixel is the final luminance value to be used for the pixel, input_pixel is the luminance value of the input pixel, and convolution_result is the high-pass filter output. A signal representation of the result of the sharpness enhancement algorithm is then generated in a known manner for each pixel of the frame.

Because the UME is calculated to account for coding characteristics, the UME prevents the enhancement of coding artifacts such as blocking and ringing. Thus, the prevention or reduction of artifacts of non-coding origin, which might result from applying too much enhancement, may be addressed by other parts of the sharpness enhancement algorithm.

Figure 5:
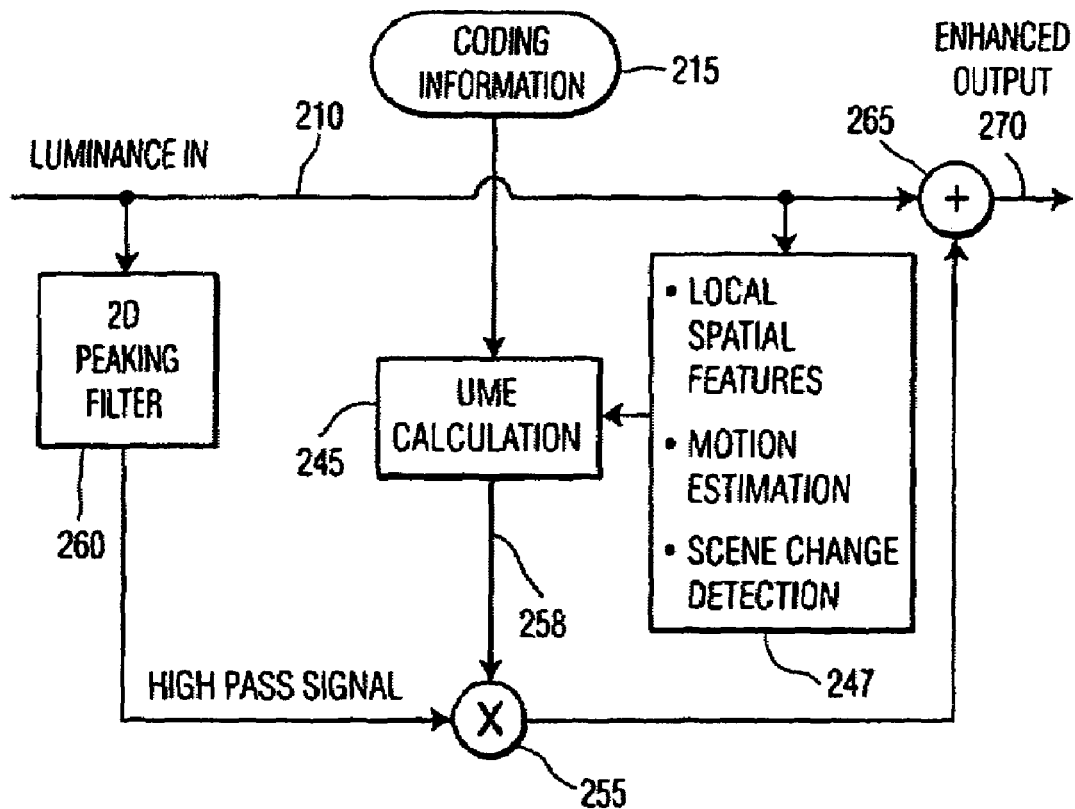
FIG. 5 is a block diagram illustrating an alternate embodiment of an adaptive peaking unit comprising a usefulness metric generator of the present invention.

FIG. 5 depicts an alternate embodiment. In FIG. 5, the four (4) control blocks 225, 230, 235, and 240 of FIG. 3 have been eliminated. Only UME calculation system 245 remains. Coding information 215 (provided on a block by block basis or on a regional basis) present in the bitstream can be retrieved during the decoding procedure. UME 258 is derived from the MPEG coding information 215 present in the bitstream, as well as local spatial features, motion estimation, and scene change detection calculations 247. It determines how much a pixel or region can be enhanced without increasing coding artifacts. In accordance with the invention, the finest granularity of MPEG information directly obtained during decoding is either: (1) based on macroblock (MB) quantities, or (2) based on block-based quantities. However, for spatial (pixel) domain video enhancement, the UME is preferably calculated for each pixel of a picture in order to ensure the highest picture quality. UME values are calculated utilizing the following criteria.

II. UME Analysis Mechanisms

As noted, various criteria or analysis mechanisms are utilized to calculate a UME. As described in detail with respect to FIGS. 6–8, different analysis mechanisms, or combination of analysis mechanisms may be used to calculate the UME. Some analysis mechanisms may calculate a UME for a block of pixels with a single calculation, while others separately calculate a UME for each pixel in a block. In an exemplary embodiment, the value of the UME can range from a value of "zero" ("0") to a value of "one" ("1"). A value of "zero" means that no sharpness enhancement is allowed for a particular pixel, while a value of "one" means that the pixel can be freely enhanced without the risk of enhancing any coding artifacts. The various analysis mechanisms are described below.

A. Coding Information

One parameter easily extracted from MPEG information is the quantization parameter (q_scale), as it is present in every coded macroblock (MB). The higher the quantization parameter, the coarser the quantization, and therefore, the higher the quantization error. A high quantization error results in coding artifacts. Consequently, enhancement of pixels in a macroblock (MB) with a high quantization parameter may be suppressed more.

Another useful item of information is the number of bits (num_bits) spent to code a macroblock (MB) or a block. Generally, the fewer bits spent for encoding a block, the lower the quality of the block. However, this quantity (num_bits) is also highly dependent on scene content, bitrate, frame type, such as I (intra), P (predicted), and B (bidirectionally predicted) frame types, motion estimation, and motion compensation.

It is also possible to consider the distribution of existing DCT coefficients in a block. In addition, motion vectors can be used to obtain information on the temporal characteristics of the video to be enhanced. It is well known that the motion vectors estimated and used for MPEG encoding do not necessarily represent true motion in the video. However, the motion vectors can help to identify static areas and use the static areas to improve the temporal consistency of the enhancement from frame to frame even when the motion vectors are not reliable.

Both the quantization parameter (q_scale) and the number of bits (num_bits) spent to code a macroblock (MB) or a block are widely used in rate control calculations of MPEG encoding.

Because a larger quantization parameter value usually results in increased coding artifacts, the UME should typically be inversely related to the quantization parameter, q_scale.

According to an embodiment of the present invention, UME generator 215 can calculate a UME for each 8×8 block according to the following equation:

$$\text{UME\_block} = 1 - M * \left(1 + \frac{q\_scale}{N}\right)^2 * \frac{\frac{q\_scale}{num\_bits}}{\max\left(\frac{q\_scale}{num\_bits}\right)}, \quad \text{Equation (1)}$$

wherein UME_block is the usefulness metric for a block of pixel data, q_scale is the quantization scale for a macroblock, num_bits is the number of bits to encode the luminance block (i.e. the number of bits to code AC coefficients of a DCT block of the luminance block), max is a function representing the maximum value for the whole frame, and M and N are experimentally determined scaling factors. The N factor is in the range of q_scale values. The M factor depends on the subjective perception of a user. For example, for a stronger sharpness enhancement the M factor is lowered, but if the user prefers a less sharp image, then the M factor can be increased. Possible M values are 1,2,4,8, etc.

B. Local Spatial Features

As shown in FIG. 5, the calculation of UME 220 may be further dependent on calculations 247. One of these calculations involves the analysis of local spatial features. A local spatial feature may be defined as a variance of the luminance value for each pixel over n×n window, covering n×n pixels. The variance is defined as follows:

$$\text{var}(i, j) = \sum_{k=-q}^{q} \sum_{m=-q}^{q} |pix(i+k, j+m) - \text{mean}| \quad \text{Equation (2)}$$

where q=(n−1)/2, pix(i+k, j+m) is the pixel value at the location (i+k, j+m) and mean is the average pixel value over said n×n window. Terms i and j are the original coordinates of a pixel and k and m are the displacement values. Alternatively, the local spatial feature may be defined as region (texture or plain areas) map.

C. Block-based Motion Estimation

Calculation of UME 220 may be further based on motion estimation information obtained from each block using the following analysis.

A block $B(\vec{X})$ is an 8×8-block start at $$\vec{X} = \begin{pmatrix} X_h \\ X_v \end{pmatrix};$$

$$B(\vec{X}) = \{\vec{x} \mid (X_h \leq x \leq X_h+7) \cap (X_v \leq y \leq X_v+7)\} \quad (3)$$

The Summed Absolute Difference, SAD, is defined as:

$$SAD(\vec{V}, \vec{X}, n) = \sum_{\vec{x} \in B(\vec{X})} |f(\vec{x}, n) - f(\vec{x} - \vec{V}, n - 1)| \quad (4)$$

where $\vec{V}$ is a vector $$\begin{pmatrix} h \\ v \end{pmatrix},$$

and n is the frame number.

Two block types are defined: "still blocks," which have less motion characteristics and "moving blocks," which have greater motion characteristics. In one exemplary embodiment, a block $B(\vec{X})$ is referred as a still block if the following condition is satisfied:

$$SAD(\vec{V_0}, \vec{X}, n) = \sum_{\vec{x} \in B(\vec{X})} |f(\vec{x}, n) - f(\vec{x} - \vec{V_0}, n - 1)| < \text{STILL\_THRED} \quad (5)$$

where $$\vec{V_0} = \begin{pmatrix} 0 \\ 0 \end{pmatrix}$$

and

STILL_THRED is a predetermined threshold, e.g., 80. If Condition (5) is not satisfied, the block is referred as moving block. The motion vector $\vec{V'}$ for $B(\vec{X})$ is the vector with the smallest SAD within the search window:

$$SW = \left\{ \vec{V} \mid \left( -\frac{(H-1)}{2} \leq h \leq \frac{(H-1)}{2} \right) \wedge \left( -\frac{(V-1)}{2} \leq v \leq \frac{(V-1)}{2} \right) \right\} \quad (6)$$

$$\forall \vec{V} \in SW, SAD(\vec{V'}, \vec{X}, n) \leq SAD(\vec{V}, \vec{X}, n)$$

D. Scene Change Detection

The goal of scene change detection is to detect the content change of consecutive frames in a video sequence. Accurate scene change detection can improve the performance of video processing algorithms. For instance, it can advise video enhancement algorithms to adjust their parameters for different scene content. Scene change detection also finds its use in video compression algorithms.

Scene change detection may be incorporated as a further step in the UME calculation, as a forced temporal consistency between different scenes can result in picture quality degradation, especially if dramatic scene change occurs.

Any known scene change detection methodology may be utilized. One exemplary method may include calculating a difference between consecutive frames of a video to produce a plurality of difference values. A histogram may then be taken of the difference values. A scene change is detected if a majority of the difference values in the histogram exceed a predetermined value.

III. UME Calculations

In the following exemplary embodiments, the UME is calculated differently depending on whether the frame is an I-frame, P-frame or B-frame. Specifically, FIG. 6 describes an I frame calculation, FIG. 8 describes P and B frame calculations, and FIG. 7 contains a subroutine "Box I" that is used in both cases.

Figure 6:
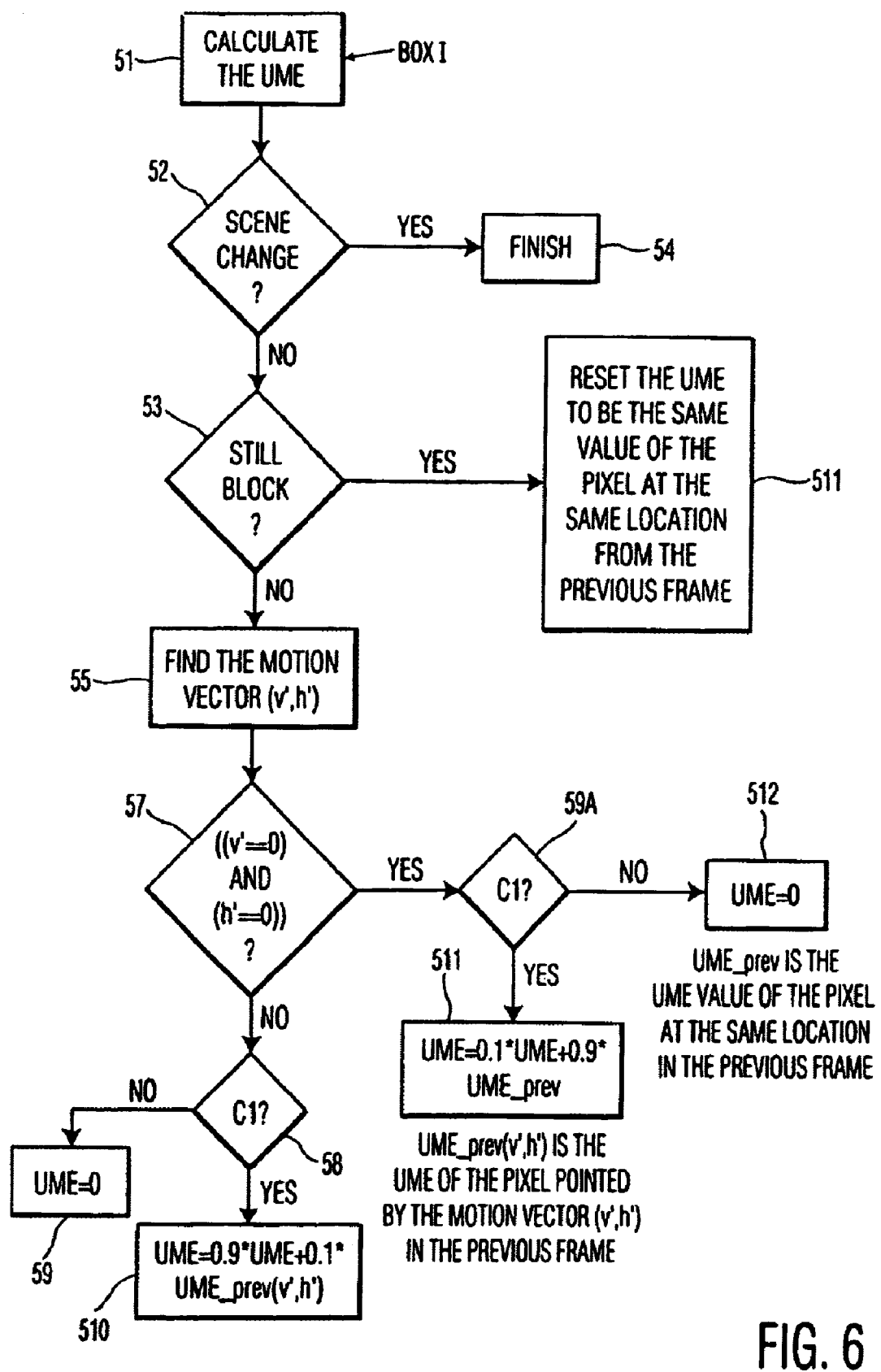
FIGS. 6–7 are flow diagrams illustrating a method of computing a UME for an I-frame.
Figure 7:
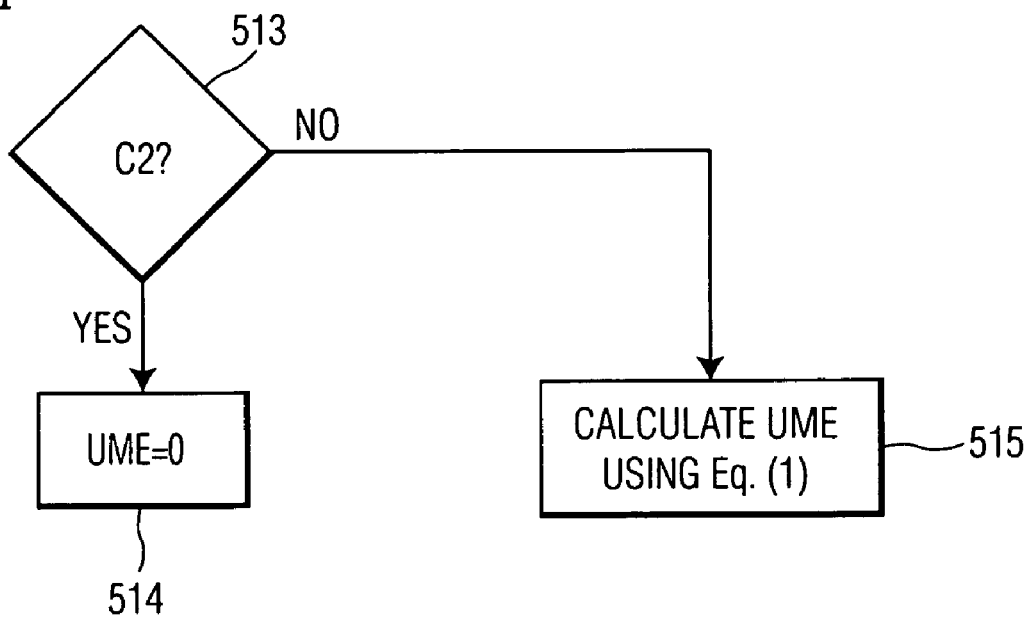

Referring first to FIGS. 6–7, a flow diagram depicting the UME calculation for an I frame is provided. In the first step S1, an initial UME value is calculated in accordance with Box I, the flow chart depicted in FIG. 7. Namely, at step S13, condition C2 is tested.

Condition C2 is defined as (var<VAR_THRED) or (num_bits=0)), wherein var is calculated in accordance with Equation (2) above, and an exemplary value for VAR_THRED is 70. If the condition C2 is not satisfied, the UME is calculated at step S15 according to Equation (1) above for UME_block. Conversely, if the condition is satisfied, the UME is set to zero at step S14. The latter case implies that either the var value is very small or the block only has DC coefficients. The latter case thus reveals that the neighborhood centered at the current pixel is likely a plain area, where block artifacts may exist and therefore sharpness enhancement should be avoided.

Next, it is determined whether a scene change has occurred at step S2. If a scene change has occurred, the algorithm ends at step S4, and the value calculated in step S1 is the final UME value. For I frames, a scene change may be flagged true if a scene change happens on any P or B frames in the previous GOP (group of pictures) before the current I frame, or if a scene change is detected on the current I frame.

In addition, if the current I frame is the first or the second I frame in a GOP, step S1 is used exclusively to calculate the UME, i.e., a scene change is presumed. Thus, UME values calculated for previous frames will not be relied upon due to the fact that the first GOP is usually encoded with a lot of uncertainties, as the adaptation of default coding parameters to a particular image sequence requires a few frames for the encoder.

If a scene change is not detected, it is next determined whether the current block is a still block at step S3 in accordance with Equation (5). If it is a still block, the UME is reset to be the same value of the pixel at the same location from the previous frame at step S6. If the current block is not a still block (i.e., it is a moving block), then the motion vector V'=(v',h') is found at step S5 in accordance with Equation (6). Next, at step S7, it is determine if both v' and h' equal zero. If one or both do not equal zero, then the condition C1 is tested at step S8, where C1 is the condition: var≧VAR_THRED. If C1 is not true, then the UME is set to zero at step S9. If C1 is true, then the UME is calculated at step S10 in accordance with the equation:

$$UME = [0.9*UME] + [0.1*UME\_prev(v',h')],$$

where UME_prev(v',h') is the UME of the pixel pointed at by the motion vector (v',h') in the previous frame.

If, alternatively, at step S7 it is determine that both v' and h' equal zero, then the condition C1 is tested at step S9A. If the condition C1 is not true, then the UME is set to zero at step S12. If the condition C1 is true, then the UME is calculated in accordance with the equation:

$$UME = [0.1*UME] + [0.9*UME\_prev],$$

where UME_prev is the UME value of the pixel at the same location in the previous frame.

Figure 8:
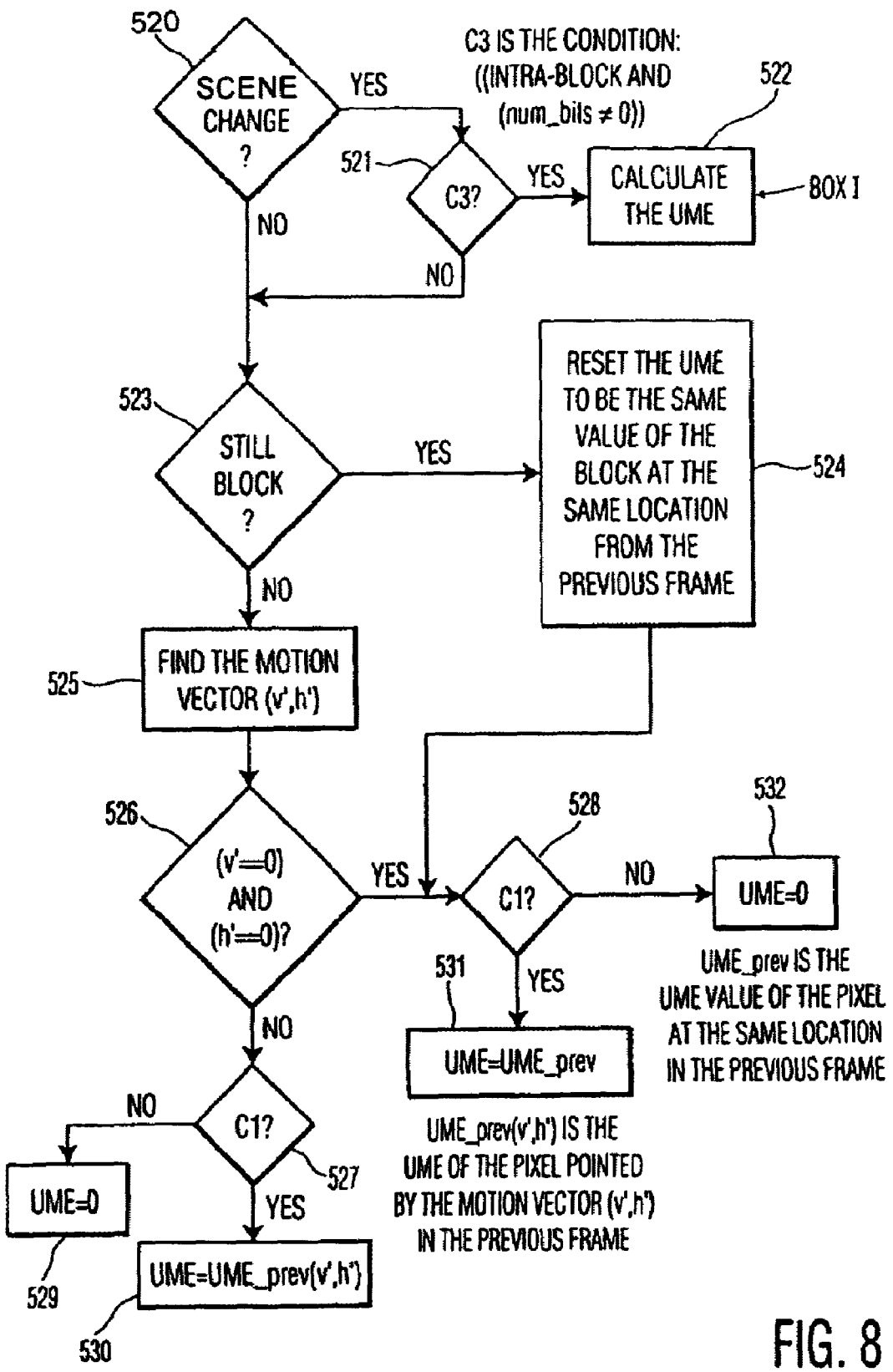
FIG. 8 is a flow diagram illustrating a method of computing a UME for a P-frame.

Referring now to FIG. 8, a flow chart for calculating a UME for a pixel in a P or B frame is provided. First, it is determined at step S20 whether or not a scene change has occurred. If a scene change did occur, then the condition C3 is tested at step S21, where C3 is the condition: Intra-block and num_bits≠0. If C3 is true, then UME is calculated at step S22 in accordance with the flow chart described in FIG. 7 (i.e., Box I). If the condition C3 is not true, or no scene change is detected at step S20, then it is determined if the current block is a still block at step S23.

If the current block is not a still block, then the motion vector (v',h') is calculated at step S25. At step S26, the motion vector components v' and h' are tested. If one or both components do not equal zero, then the condition C1 is tested at step S27. If C1 is not true, then the UME is set to zero at step S29. If C1 is true, then the UME is set UME_prev(v',h') at step S30, where UME_prev(v',h') is the UME of the pixel pointed by the motion vector (v',h') in the previous frame.

At step S26, if both components v' and h' equal zero, then the condition C1 is tested at step S28. If C1 is not true, then the UME is set to zero at step S32. If C1 is true, then the UME is set to UME_prev at step S31, where UME_prev is the UME value of the pixel at the same location in the previous frame.

Finally, if it is determined (back at step S23) that the current block is a still block, then the UME is reset to be the same value of the block at the same location from the previous frame at step S24. Next step S28 is repeated in the same manner described above.

The methods and systems of the present invention, as described above and shown in the drawings, provide for an improved way to enhance the quality of a digital coded video signal, by utilizing a sharpness enhancement algorithm. It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

The invention claimed is:

1. A system for enhancing sharpness of a coded digital video signal representative of a frame of block-based data, said system comprising:
a system for calculating a usefulness metric for enhancement (UME) of each pixel in the frame in accordance with a frame type, wherein the calculating system includes:
a mechanism that defines local spatial features in the frame;
a mechanism that analyzes block-based motion estimation for the frame; and
a mechanism that detects a scene change in the frame; and
a sharpness enhancer that improves sharpness to a decoded version of the digital video signal based on said UME.

2. A system for enhancing sharpness of a coded digital video signal representative of a frame of block-based data, said system comprising:
a system for calculating a usefulness metric for enhancement (UME) of each pixel in the frame in accordance with a frame type, wherein the calculating system includes:
a mechanism that defines local spatial features in the frame;
a mechanism that analyzes block-based motion estimation for the frame; and
a mechanism that detects a scene change in the frame; and
a sharpness enhancer that improves sharpness to a decoded version of the digital video signal based on said UME,
wherein the calculating system further includes a mechanism that analyzes macroblock and block based coding information according the formula:

$$\text{var}(i, j) = \sum_{k=-q}^{q} \sum_{m=-q}^{q} |pix(i+k, j+m) - \text{mean}|$$

wherein UME_block is a usefulness metric for a block of pixel data, q_scale is a quantization scale for a macroblock, num_bits is a number of bits to encode a luminance block, max is a function representing a maximum value for the frame, and M and N are scaling factors.

3. The system of claim 2, wherein the local spatial features are defined as a variance of pixel luminance values over an n×n window covering n×n pixels, said variance defined according to the equation:

$$\text{var}(i, j) = \sum_{k=-q}^{q} \sum_{m=-q}^{q} |pix(i+k, j+m) - \text{mean}|$$

wherein $q=(n-1)/2$, $pix(i+k, j+m)$ is a pixel value at location $(i+k, j+m)$ and mean is an average pixel value over said n×n window.

4. The system of claim 3, wherein the UME of a pixel in an I frame is calculated using UME_block if:
$(\text{var}(i,j) \geq \text{VAR\_THRED})$ and $(\text{num\_bits} \neq 0)$; and
a scene change is detected,
wherein VAR_THRED is a predetermined threshold value.

5. The system of claim 3, wherein the mechanism that analyzes block-based motion estimation for the frame determines if the block is a still block.

6. The system of claim 3, wherein the mechanism that analyzes block-based motion estimation for the frame calculates a motion vector (v',h') if a current block is not a still block, wherein the motion vector (v',h') is a motion vector in a block $B(\vec{X})$ having a smallest summed absolute difference (SAD) in a search window, and wherein the summed absolute difference for a vector $\vec{V}$ in a frame n is defined as:

$$SAD(\vec{V}, \vec{X}, n) = \sum_{\vec{x} \in B(\vec{X})} |f(\vec{x}, n) - f(\vec{x} - \vec{V}, n-1)|$$

where $f(\vec{x}, n)$ is a pixel value at location $\vec{x}$.

7. The system of claim 6, wherein if the block is not a still block, the calculating system tests to determine if both v' and h' equal zero.

8. The system of claim 7, wherein if the block is not a still block, the calculating system sets the UME to zero if var<VAR_THRED, wherein VAR_THRED is a predetermined threshold value.

9. The system of claim 8, wherein if the block is not a still block and both v' and h' equal zero, the calculating system sets the UME to UME=[0.1*UME]+[0.9*UME_prev] if var≥VAR_THRED, where UME_prev is the UME value of a pixel at the same location in a previous frame.

10. The system of claim 8, wherein if the block is not a still block and if at least one of v' and h' do not equal zero, the calculating system sets the UME to UME=[0.9*UME]+[0.1*UME_prev(v', h')], if var≥VAR_THRED, where UME_prev(v', h') is the UME value of the pixel pointed by the vector (v', h') in the previous frame.

11. The system of claim 1, wherein said sharpness enhancement algorithm is a peaking algorithm.

12. The system of claim 1, wherein said sharpness enhancement algorithm is a spatial-domain algorithm.

13. A system for enhancing sharpness of a coded digital video signal representative of a frame of block-based data, said system comprising:
a system for calculating a usefulness metric for enhancement (UME) of each pixel in the frame in accordance with a frame type, wherein the calculating system includes:
a mechanism that defines local spatial features in the frame;
a mechanism that analyzes block-based motion estimation for the frame; and
a mechanism that detects a scene change in the frame; and
a sharpness enhancer that improves sharpness to a decoded version of the digital video signal based on said UME,
wherein the sharpness enhancement algorithm applied is:

out_pixel=input_pixel+*UME*\*convolution_result, wherein output_pixel is a final luminance value to be used for the pixel, input_pixel is a luminance value of the input pixel, and convolution_result is a high-pass filter output.

14. A method for enhancing sharpness of a coded digital video signal representative of a frame of block-based data, the method comprising:
defining local spatial features in the frame;

analyzing block-based motion estimation for the frame;
detecting a scene change in the frame;
calculating a usefulness metric for enhancement (UME) of each pixel in the frame based on local spatial features block-based motion estimation and detected scene changes; and
improving sharpness of the frame by applying the UME calculated for each pixel.

15. A method for enhancing sharpness of a coded digital video signal representative of a frame of block-based data, the method comprising:
defining local spatial features in the frame;
analyzing block-based motion estimation for the frame;
detecting a scene change in the frame;
calculating a usefulness metric for enhancement (UME) of each pixel in the frame based on local spatial features, block-based motion estimation and detected scene changes; and
improving sharpness of the frame by applying the UME calculated for each pixel,
wherein the calculating step is further based on a mechanism that analyzes macroblock coding information according the formula:

$$\text{UME\_block} = 1 - M * \left(1 + \frac{q\_scale}{N}\right)^2 * \frac{\frac{q\_scale}{num\_bits}}{\max\left(\frac{q\_scale}{num\_bits}\right)}$$

wherein UME_block is a usefulness metric for a block of pixel data, q_scale is a quantization scale for a macroblock, num_bits is a number of bits to encode a luminance block, max is a function representing a maximum value for the frame, and M and N are scaling factors.

16. The method of claim 15, wherein the local spatial features for a pixel at location (i,j) is defined as a variance of pixel luminance values over an n×n window covering n×n pixels, said variance defined according to the equation:

$$\text{var}(i, j) = \sum_{k=-q}^{q} \sum_{m=-q}^{q} |pix(i+k, j+m) - mean|$$

wherein q=(n−1)/2, pix(i+k, j+m) is a pixel value at location (i+k, j+m) and mean is an average pixel value over said n×n window.

17. The method of claim 16, wherein the UME of a pixel in an I frame is calculated using UME_block if:
(var(i,j)≧VAR_THRED) and (num_bits≠0); and
a scene change is detected,
wherein VAR_THRED is a predetermined threshold value.

18. The method of claim 16, wherein the UME of a pixel in a current block of a P and B frame is calculated using UME_block if:
a scene change is detected;
num_bits do not equal zero; and
the current block is an intrablock.

19. The method of claim 16, wherein the calculating step includes the steps of:
determining if a scene change occurs in the frame; and
if no scene change occurs, using the mechanism that analyzes block-based motion estimation for the frame to determine if a current block is a still block.

20. The method of claim 19, wherein the calculating step includes the further step of:
if the current block is not a still block, using the mechanism that analyzes block-based motion estimation for the frame to calculate a motion vector (v',h'), wherein the motion vector (v',h') is a motion vector in a block $B(\vec{X})$ having a smallest summed absolute difference (SAD) in a search window, and wherein the summed absolute difference for a vector $\vec{V}$ in a frame n is defined as:

$$SAD(\vec{V}, \vec{X}, n) = \sum_{\vec{x} \in B(\vec{X})} |f(\vec{x}, n) - f(\vec{x} - \vec{V}, n - 1)|$$

where $f(\vec{x}, n)$ is a pixel value at location $\vec{x}$.

21. The method of claim 20, wherein the calculating step includes the further step of:
determining if both v' and h' equal zero.

22. The method of claim 21, wherein the calculating step includes the further step of: testing if var≧VAR_THRED, wherein VAR_THRED is a predetermined threshold value.

23. The method of claim 22, wherein, if v' and h' both equal zero, the calculating step includes the further steps of:
setting the UME to zero if var<VAR_THRED; and
setting the UME to UME_prev if var≧VAR_THRED, where UME_prev is the UME value of a pixel at the same location in the previous frame.

24. The method of claim 22, wherein, if at least one of v' and h' do not equal zero, the calculating step includes the further steps of:
setting the UME to zero if var<VAR_THRED; and
setting the UME to UME_prev(v',h') if var≧VAR_THRED, where UME_prev(v',h') is the UME of a pixel pointed by the motion vector (v',h') in the previous frame.

25. The method of claim 14, wherein the step of improving sharpness is implemented using the formula:

out_pixel=input_pixel+*UME*\*convolution_result, wherein output_pixel is a final luminance value to be used for the pixel, input_pixel is a luminance value of the input pixel, and convolution_result is a high-pass filter output.

26. A program product stored on a recordable medium for calculating a usefulness metric for enhancement (UME) for each pixel in a frame of video data, the program product comprising:
means for defining local spatial features in the frame;
means for analyzing block-based motion estimation for the frame;
means for detecting a scene change in the frame; and
means for calculating the UME using the defining means, analyzing means, and detecting means.

27. A program product stored on a recordable medium for calculating a usefulness metric for enhancement (UME) for each pixel in a frame of video data, the program product comprising:
means for defining local spatial features in the frame;
means for analyzing block-based motion estimation for the frame;
means for detecting a scene change in the frame; and
means for calculating the UME using the defining means, analyzing means, and detecting means, wherein the means for defining local spatial features in the frame defines a variance of pixel luminance values over an n×n window covering n×n pixels for a pixel at location (i, j), said variance defined according to the equation:

$$\text{var}(i, j) = \sum_{k=-q}^{q} \sum_{m=-q}^{q} |pix(i+k, j+m) - mean|$$

wherein q=(n−1)/2, pix(i+k, j+m) is a pixel value at location (i+k, j+m) and mean is an average pixel value over said n×n window.

28. The program product of claim 26, wherein the means for analyzing block-based motion estimation for the frame includes means for determining if a current block is a still block.

29. A program product stored on a recordable medium for calculating a usefulness metric for enhancement (UME) for each pixel in a frame of video data, the program product comprising:
means for defining local spatial features in the frame;
means for analyzing block-based motion estimation for the frame,
means for detecting a scene change in the frame; and
means for calculating the UME using the defining means, analyzing means, and detecting means,
wherein the means for analyzing block-based motion estimation for the frame further includes:
means for calculating a motion vector (v',h'), wherein the motion vector (v',h') is a motion vector in a block $B(\vec{X})$ having a smallest summed absolute difference (SAD) in a search window, and wherein the summed absolute difference for a vector $\vec{V}$ in a frame n is defined as:

$$SAD(\vec{V}, \vec{X}, n) = \sum_{\vec{x} \in B(\vec{X})} |f(\vec{x}, n) - f(\vec{x} - \vec{V}, n-1)|$$

where $f(\vec{x}, n)$ is a pixel value at location $\vec{x}$.

* * * * *